United States Patent
Khanka

(10) Patent No.: US 11,310,229 B2
(45) Date of Patent: Apr. 19, 2022

(54) DEVICE AUTHENTICATION

(71) Applicant: T-Mobile USA, Inc., Bellevue, WA (US)

(72) Inventor: Bhagwan Singh Khanka, Bothell, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 222 days.

(21) Appl. No.: 16/453,783

(22) Filed: Jun. 26, 2019

(65) Prior Publication Data

US 2020/0412714 A1 Dec. 31, 2020

(51) Int. Cl.
*G06F 21/00* (2013.01)
*H04L 29/06* (2006.01)

(52) U.S. Cl.
CPC ................ *H04L 63/0861* (2013.01)

(58) Field of Classification Search
CPC ........... H04L 63/0861; H04L 63/0853; H04W 12/065; G06F 21/32
See application file for complete search history.

(56) References Cited

U.S. PATENT DOCUMENTS

| | | | |
|---|---|---|---|
| 8,260,262 B2 | 9/2012 | Ben Ayed | |
| 2004/0236701 A1 | 11/2004 | Beenau et al. | |
| 2009/0037743 A1* | 2/2009 | Narayanaswami | ... H04L 9/3231 713/186 |
| 2010/0273147 A1* | 10/2010 | Valenti | ................... G16B 50/00 435/6.11 |
| 2013/0307670 A1* | 11/2013 | Ramaci | ............... H04L 63/0861 340/5.82 |
| 2014/0337949 A1 | 11/2014 | Hoyos | |
| 2017/0174180 A1 | 6/2017 | Hoyos et al. | |
| 2017/0249451 A1 | 8/2017 | Andreeva | |
| 2018/0060989 A1* | 3/2018 | Hietanen | ................ G06Q 30/04 |
| 2018/0288041 A1* | 10/2018 | Zavesky | ............. H04L 63/0815 |

FOREIGN PATENT DOCUMENTS

WO 20190063852 A1 4/2019

OTHER PUBLICATIONS

Physics Central, "Breathprint" Identification, www.physicscentral.com/explore/action/breathprint.cfm, accessed on Apr. 8, 2019.
European search report, dated Oct. 19, 2020, in European Application No. EP20178114.3, date of filing Jun. 3, 2020.

* cited by examiner

*Primary Examiner* — Brandon S Hoffman
*Assistant Examiner* — William A Corum, Jr.
(74) *Attorney, Agent, or Firm* — Lane Powell PC

(57) ABSTRACT

Systems and methods of biometrically authenticating a user of a device. A biometric sample of a user can be analyzed to generate a user-specific biometric signature that is substantially unique to the specific user. To authenticate a user, a biometric sample can be obtained and analyzed to determine if the biometric signature is present in the sample. If so, the user can be biometrically authenticated to use the device. The device can provide a network with an indication of the authentication of the user to authenticate the device to the network. In response to the authentication, the network can provide the device access to the network, its resources, or portion(s) thereof.

19 Claims, 5 Drawing Sheets

DEVICE AUTHENTICATION

BACKGROUND

Cellphones and other cellular network capable based devices, such as tablets and access points, continuously exchange data with carrier/provider networks to facilitate the authentication of the device on the network. The authentication of the device allows the device to access various features/resources of the network, such as allowing the cellphone to make calls and/or access the Internet through the cell network. As cellphones, and/or other cellular devices, move into different geographic coverage zones, the authentication process is repeated. Similarly, to initiate a phone call from the cellphone, the authentication process is again initiated prior to connecting the call to validate/authenticate the cellphone and/or its use of network resources. The authentication process requires a process of data exchange between the cellphone and the network, and networks must allocate bandwidth to allow this continuous authentication process to occur.

The network can require an authentication process to assist with ensuring the security and/or function of the network. For example, the authentication process can confirm that the user is a valid subscriber of the network and should be provided the requested resources/access. In another example, the network can support subscribers of another network, such as a cellphone carrier/provider allowing access to subscribers of another network. The network requires a means of authenticating such users to confirm they should be provided access to the network and/or its resources. The authentication process requires data to be exchanged between the device and the network. While the amount of data exchanged to authenticate an individual cellphone is relatively small, the large number of cellphones on each network requires that a considerable amount of network bandwidth/capability is reserved for the authentication process. Since the bandwidth of the networks is inherently limited, the dedication of bandwidth for the authentication process reduces the network bandwidth available for other uses, such as use by consumers/subscribers. As such, systems and methods that reduce the bandwidth requirement of the authentication process can provide significant improvements and/or savings to carriers/providers by allowing them additional bandwidth to allocate to other network capabilities.

DETAILED DESCRIPTION

Figure 1:
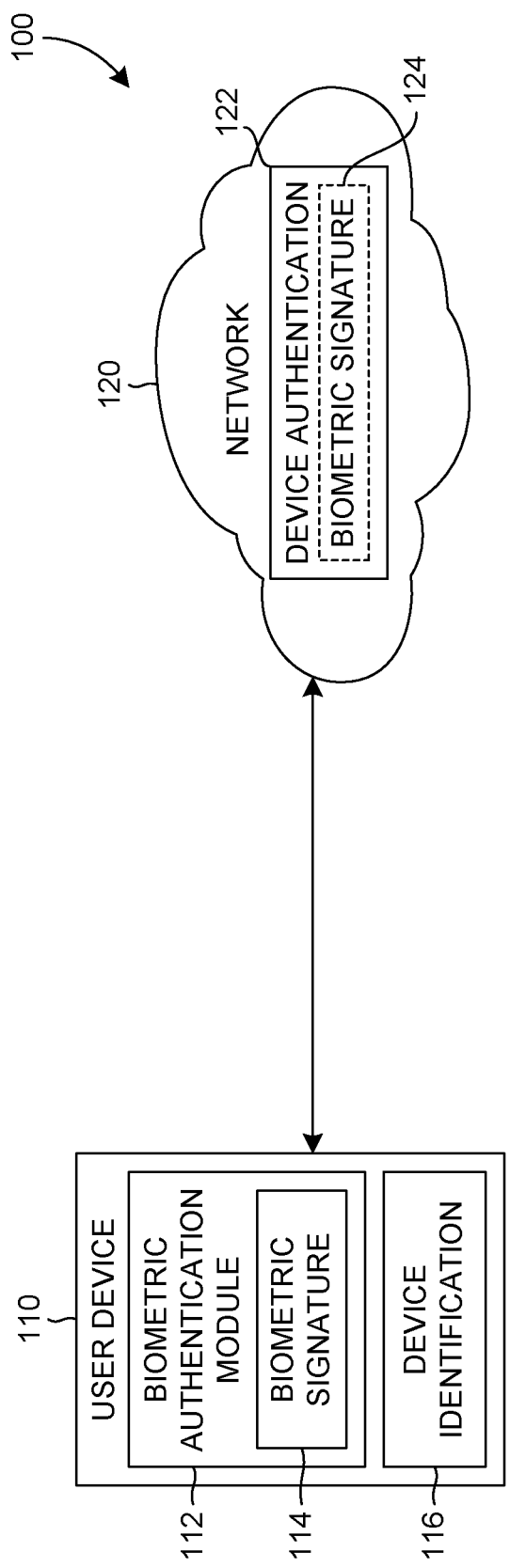
FIG. 1 is an example interaction between a user device and network.

Described herein are systems and methods for device authentication. The systems and methods authenticate a user of the device for either use of the device or authenticate the device and its user to access a network and its resource(s). The user authentication can be used to authenticate the device to a network to allow the device to access one or more resources/features of the network. In this manner, the device can authenticate itself to the network based on the authentication of the user of the device. The self-authentication of the device reduces the amount of data exchange needed between the device and the network and reduces the network bandwidth allocation required for authentication purposes.

Security/integrity of the authentication process can be maintained by using biometric authentication of the user. A biometric signature of the user can be determined/generated and stored on the device. The biometric signature is a substantially user-specific/unique biometric characteristic(s)/property(s) of the user. Due to the substantially unique aspect of the biometric signature, it is unlikely that another person will have the same user-specific/unique biometric characteristic(s)/property(s). As such, the ability of another person to be able to be biometrically authenticated as the user is statistically low.

To authenticate a user, a biometric sample can be received from the user. The biometric sample can be an image, such as a facial photo of the user or a scan of the user's fingering; an audio sample, such as a recording of the user speaking; a genetic material containing sample, such as blood, saliva or exhaled breath condensate, and/or other biometric sample. The biometric sample can be analyzed, such as by genetic analysis, image analysis/recognition, or audio analysis/recognition, to determine if the biometric signature is present within, or correlates with, the analyzed biometric sample. If so, the user can be authenticated and can be permitted to access the device. The authentication of the user can also be used by the device to authenticate the device to a network, such as by providing an indication/notification to the network, to allow/permit the device to access the network, its resources/features, or portion(s) thereof.

The biometric signature of a user can be generated/determined by the device during setup. The user can provide a biometric sample as part of the device or registered user setup. The biometric sample can be analyzed and the biometric signature can be generated/determined from the analysis. In an example, the biometric signature can be a genetic sequence, such as a portion of the user's genome that is substantially unique to the user. In another example, a third party can analyze a user's biometric sample to generate/determine the user's biometric signature. This biometric signature can then be provided/transmitted to the device for use in biometric authentication processes. The device can include multiple biometric signatures, with each being associated with one or more users of the device, allowing the device to be used by multiple users that can be biometrically authenticated to use the device and/or a network communicatively coupled thereto.

The biometric sample analysis can occur on the device and one or more biometric samples can be received/analyzed as part of the biometric authentication process. The use of multiple samples/analyses can further increase the security/integrity of the biometric authentication of the user. Alternatively, or additionally, user-generated authentication, such as a password/passcode, can be used in conjunction with the biometric authentication.

FIG. 1 is an example interaction 100 between a user device 110 and a network 120, such as a cellphone network or other network having access, features, functions, capabilities, and/or portions thereof that require authentication/validation. The user device 110 can access the network 120, and/or resources contained thereon or accessible by, when/after the user device 110 is authenticated. Prior to authentication to the network 120, the user device 110 can have access to none or a portion of the network 120, its resources, systems, features, connectivity and/or other capabilities/functions provided by or accessible to the network 120. Once authenticated, the user device 110 can be granted access to the network 120, or portion(s) thereof, such as based on the authentication of the device or permissions associated therewith.

In the example shown, the user device 110 can authenticate itself to the network 120 and/or the network 120 can authenticate the user device 110 prior to granting the user device 110 access/functionality that requires authentication. To authenticate itself, the user device 110 can perform an on-device authentication procedure to validate the authenticity of the user and/or the user device 110 and then provide the network 120 with an indication/notification of the authenticity of the user device 110 to access the network 120 and/or resources thereof. In another embodiment, the network 120 can receive from the user device 110 authentication data, such as a biometric signature 114, that can be verified against a stored biometric signature 124, to validate the user device 110 and allow the user device 110 access to the network 120 and/or its resources. In embodiments, the self-authentication of the user device 110, authentication by the network 120, or a combination thereof, can be used to authenticate/validate the user device 110 and grant the user device 110 access to the network 120 and/or features/resources thereof. The self-authentication of the user device 110 reduces the bandwidth required for other/traditional authentication procedures/processes between the user device 110 and the network 120. Additionally, this efficient authentication method reduces the time required to authenticate the user device 110, allowing the user device 110 to more quickly access the network 120 and/or its resources.

The user device 110 can include a biometric authentication module 112 and a biometric signature 114 of one or more users of the device. The biometric signature 114 is a unique, or substantially unique, biometric characteristic/property of a user, such as a genetic sequence, fingerprint, retinal pattern, speech characteristics, and/or other features/characteristics of the user. The biometric authentication module 112 can acquire or receive a biometric sample and can then determine if the biometric signature 114 of a user is present within the sample. If the biometric signature 114 is present in the biometric sample, then the user can be considered a valid user of the user device 110. Authenticated/valid users are known and approved for use of the user device 110 and can be known to the network 120 as valid/authentic users, such as by having a subscription, account or profile on the network, and that the uses/user device should be granted access to the network 120, and/or its resources/features. The user device 110 can notify/inform the network 120 that an authenticated user has been properly authenticated/validated and the network 120 can allow the user device 110 access to the network 120, and/or its resources/features, based on the authentication of the user of the user device 110.

The user device 110 can include device identification 116, such as an International Mobile Subscriber Identity (IMSI) and/or a Mobile Stations International Subscriber Directory Number (MSISDN). In response to authenticating a user, the user device 110 can provide the device identification 116 and an indication/notification of a successful on-device authentication/validation of a device user to the network 120. The network 120 can then validate/authenticate the device identification 116 to allow the user device 110 access to the network 120 and/or its resources/features.

As part of communicating its authentication, the user device 110 can provide the network 120 with the biometric signature 114 of the authenticated/validated user. The transmitted biometric signature 114 can optionally be used by the network 120 to validate/authenticate the user device 110 and/or assist with the validation/authentication of the user device 110 by the network 120. The biometric signature 114 is one or more biometric characteristics/properties, such as a genetic sequence, face, fingerprint, speech and/or other biometric characteristics/properties of the user, that are substantially unique to the user. In this manner, the biometric signature 114 is substantially unique to a specific user and unlikely to be present in a biometric sample acquired/received from another user.

The biometric authentication module 112 can include one or more devices/systems to process a biometric sample from a user to determine the presence of, or a correlation with, the stored biometric signature 114 of a valid user. Elements, devices and/or systems of the biometric authentication module 112 can convert the received biometric sample into an electrical signal/characteristic. The electrical signal/characteristic is indicative of the biometric properties/characteristics of the biometric sample and can be used to analyze the biometric sample to determine a correlation or presence of the biometric signature 114 in the biometric sample. In an example, the biometric signature 114 can be a substantially unique portion of the valid user's genetic sequence/genome. Therefore, in this example, the biometric sample used to validate a user is a sample that includes genetic material of the user. The genetic material containing biometric sample can be processed/analyzed by the biometric authentication module 112, such as by genetic analysis, to determine if the biometric signature 114 is present in the sample. The use of a biometric signature 114, rather than the complete genetic sequence of a user, allows for more efficient processing of the biometric sample since the biometric authentication module 112 only needs to confirm the presence or not of the biometric signature 114 in the biometric sample.

To process/analyze a genetic material containing biometric sample, the biometric authentication module 112 can include devices/systems that can prepare the genetic sample, such as opening the DNA strand(s) for analysis, and devices/systems that analyze the genetic sample, such as converting genetic identifiers, like a sequence of nucleotides, into a voltage/electrical signal that is representative of the sensed genetic identifiers. The electric signal can then be processed/analyzed to determine if the biometric signature 114 is present in the biometric sample. Alternatively, other systems/methods of processing/analyzing the biometric sample on/by the user device can be used, such as the examples discussed later in this application.

The network 120 can include device authentication 122 that can authorize, authenticate and/or validate the user device 110, such as in response to a communication from the user device 110. The device authentication 122 can receive the communication/notification of the successful user validation/authentication from user device 110, and then can authenticate the user device 110 to grant the user device 110 access to the network, its resources/features, or portions thereof.

The device authentication 122, optionally, can include stored biometric signatures 124 of various users of various user devices that are permitted to access the network 120, its resources/features, or portion(s) thereof. The user device 110 can provide the biometric signature 114 of a user authenticated/validated by the user device 110, to the network 120 and the device authentication 122 can compared the received biometric signature 114 to the stored biometric signature 124 to assist with, or confirm, the validation/authentication of the user device 110 to the network 120.

The substantially unique nature of the biometric signature 114 assists in confirming the identity of the user of the user device 110 as a permitted, or valid/authentic, user of the user device 110. There is a high likelihood that a user providing a biometric sample containing the biometric signature 114 is the same user from which the biometric signature 114 was first established/determined. The biometric signature 114 can be created/stored by the biometric authentication module 112, such as part of a user setup on/of the user device 110, and the biometric authentication module 112 can permit a user to access the user device 110 based on a determination that the biometric sample supplied by a user contains the biometric signature 114 previously associated with an authentic/valid user of the user device 110. In response to authenticating/validating a user, the biometric authentication module 112 can unlock the device from a secure state to a usable state, which can allow the user to use/interact with the user device 110, such as to access the network 120, its resources/features/functions, or portion(s) thereof.

Figure 2:
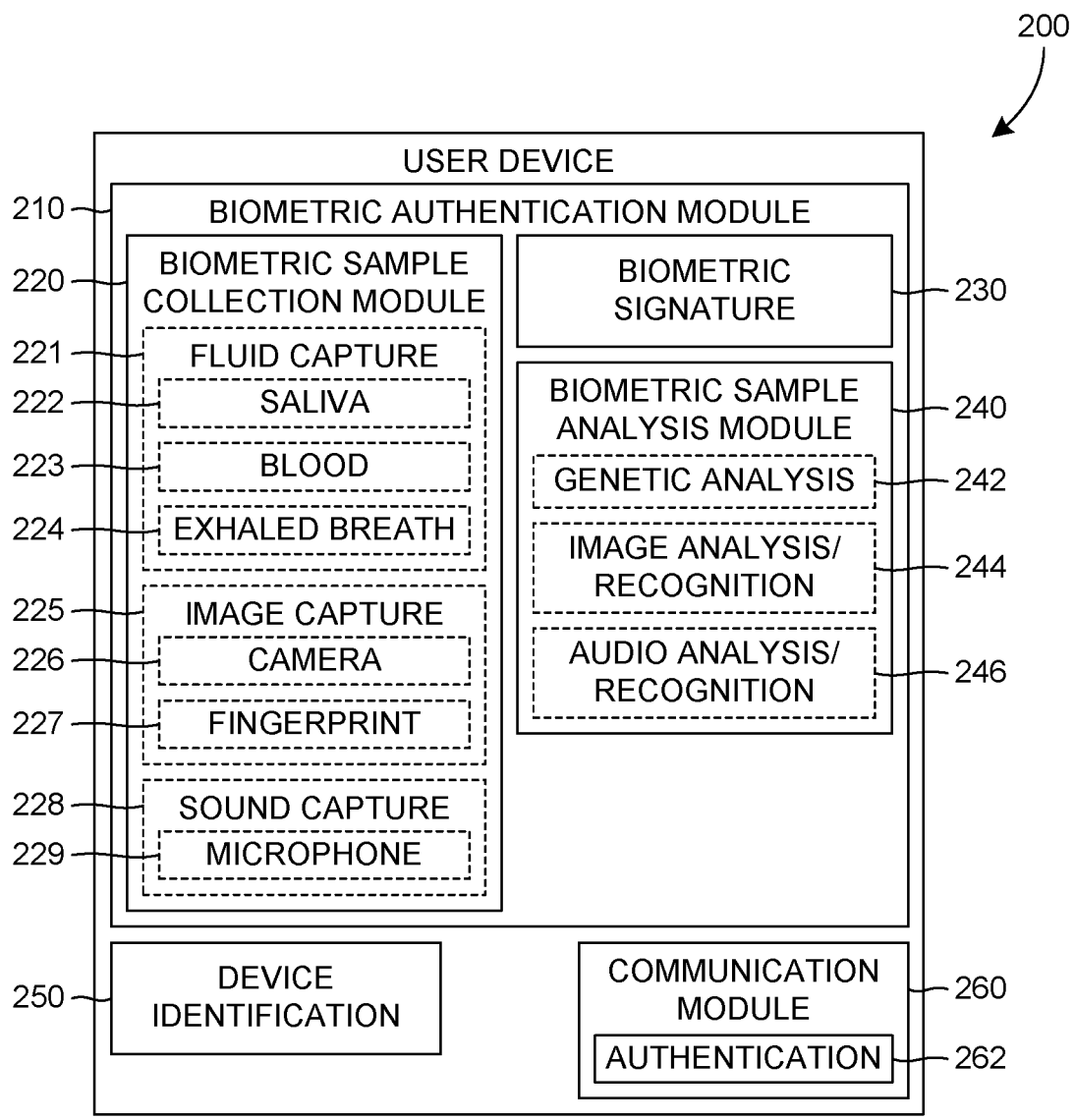
FIG. 2 is a block diagram of an example user device.

FIG. 2 is a block diagram of an example user device 200 that includes a biometric authentication module 210, a device identification 250 and a communication module 260. The biometric authentication module 210 can biometrically authenticate a user of the user device 200 to allow the user to access and/or interact with the user device 200. In addition to, or separately from, authenticating a user to use the user device 200, the biometric authentication of the user can be used to validate/authenticate the user device 200 to a network, such as by the communication module 260, to allow the user device 200 to access the network, its resources/features or portion(s) thereof. In a non-authenticated state, the user device 200 can have limited/reduced access to the network, and/or its resources/features, and the network, its resources/features or portion(s) thereof, can be accessible/available to the user device 200 based on the authentication of a user by the biometric authentication module 210.

To determine if a user is authentic, the biometric authentication module 210 can acquire/receive a biometric sample by the biometric sample collection module 220, the biometric sample can then be analyzed by a biometric sample analysis module 240 to determine if a biometric signature 230 of the user is present in the biometric sample. Due to the substantially unique nature of the biometric signature 230, the determination of the presence of the biometric signature 230 in the collected biometric sample indicates a high/significant likelihood that the person who supplied the biometric sample is the same as the user associated with the biometric signature 230. The specificity of the biometric signature 230 to a particular and valid/authentic person/user reduces the chance/likelihood that another person, other than the valid user, can provide a biometric sample containing the biometric signature 230. In this manner, valid users, which are those users able to supply a biometric sample having a valid biometric signature 230, are permitted access to the user device 200, while other users are not. As part of allowing the valid user access to the user device 200, the biometric authentication of the user can allow the user device 200 access to a network, its resources/features or portions thereof, communicatively coupled to the user device 200 based on the biometric authentication of the user.

The biometric sample collection module 220 can collect, capture or otherwise obtain one or more biometric samples from a user, such as capturing a fluid sample 221, image sample 225 and/or sound sample 228. The user can provide, and/or the capture 221, 225, 228 can obtain, a biometric sample for analysis. The various captures 221, 225, 228 can include devices and/or systems to assist with obtaining and/or processing the biometric sample for analysis.

The fluid capture 221 can capture a fluid biometric sample, such as saliva 222, blood 223, exhaled breath condensate 224 and/or other fluid biometric samples that are, or contain a portion that is, substantially unique to the user. The fluid biometric sample can contain genetic material of the user that can be used for genetic analysis 242, and/or a chemical/biological composition that can be analyzed. Substantially unique characteristics of the fluid biometric sample can be a biometric signature 230, such as a genetic sequence or portion thereof, and/or a chemical/biological composition of the sample that is substantially unique to the user, such as due to the user's individual biochemistry.

To capture a saliva 222 biometric sample, the fluid capture 221 can include a receiver or opening into which a user can place/deposit a saliva sample 222. Saliva contains epithelial cells, which contain genetic material of the user who provided the sample and can be used to determine the presence of a genetic biometric signature 230 of an authorized user. The captured saliva 222 sample can be analyzed to determine the presence of a biometric signature and allow the user to access the user device 200 and/or a network communicatively coupled to the user device 200, and/or features/functions, or portions thereof, of each or both.

Another saliva 222 capture system/method can include an element of the user device 200 that the user places in their mouth or is capable of otherwise receiving a user saliva sample. For example, an extendible probe, or sample collector, can be included on the user device 200. The extended probe can then be placed in the user's mouth to capture the saliva 222 sample.

To capture a blood 223 biometric sample, the fluid capture 221 can include a receiver or opening in which a user can deposit a blood 223 sample. The blood 223 sample contains genetic material of the user and, like the saliva 222 sample, can be analyzed for the presence of a genetic biometric signature 230. The user device 200 can include a piercing element that the user can use to pierce their skin to obtain the blood sample 223. An amount of blood can be placed in a receiver/opening of the user device 200 for analysis. Alternatively, the user device 200 can include a testing substrate, such as a fibrous testing strip, that can capture and retain the blood sample 223 for analysis.

An exhaled breath condensate 224 biometric sample contains genetic material from the lining of the user's airway, which can be analyzed for the presence of a genetic biometric signature 230. To capture a user's exhaled breath condensate 224, the user device 200 can include a conduit, opening, or other receiver, that a user can exhale into or that is positioned to receive a user's exhalation, such as near or integrated with a microphone of the user device 200. The exhaled breath condensate 224 capture can be structured to condense the user's exhalation, such as a conduit along which the user's breath will condense so that the exhaled breath of the user is captured as a fluid. The biometric sample analysis can then be performed on the condensed sample of the user's exhalation.

The image capture 225 can include a camera 226, a fingerprint sensor 227 and/or other image capture device. The image capture can be used image a physical feature of the user, such as the user's face, retina or fingerprint, which can then be processed/analyzed to determine the presence of a biometric signature 230 in the captured image. The camera 226 can be used to obtain an image of the user's face for facial recognition or an image of the user's retinal pattern for retinal recognition with the biometric signature 230. The fingerprint sensor 227 can capture an image, or representative thereof, of the user's fingerprint, which can be processed/analyzed for various features/characteristics that can be compared to the biometric signature 230.

The sound capture 228 can, optionally, include a microphone 229 to obtain an audio sample from the user, such as a user's speech. The captured audio sample can be analyzed and compared to the biometric sample 230 to determine the presence of substantially unique or user-specific properties/characteristics in the captured audio sample.

In an embodiment, the user can be required to provide more than one biometric sample. The use of multiple biometric samples can allow for stronger security by further confirming the validity/authenticity of the user that supplied the biometric sample(s) and/or can allow for error in the various sample analyses, such as allowing the user to be authenticated based on the successful authentication of one biometric sample when another biometric analysis fails to successfully authenticate the user. In the latter, the capture of multiple biometric samples concurrently can reduce delays caused by requiring subsequent biometric sample collection after an authentication failure of a previously provided biometric sample.

The biometric signature 230 is a substantially unique/user specific biometric sample characteristic or property, such as a genetic sequence, face, fingerprint, speech and/or other biometric properties of the user. The biometric signature of the user can be initially configured/obtained/determined from a first provided biometric sample of the user. For example, during an initial setup of a user on the user device 200, such as creating a user profile, the user can be prompted to provide a biometric sample. The biometric sample can be analyzed for various properties/characteristics and these can be stored as the biometric signature 230 of the associated user. For example, for a facial recognition-based biometric signature, an initial photo(s)/image(s) of the user can be analyzed/processed to convert the user's face into an electronic file that is indicative of the various features/structures of the user's face. Similarly, other biometric samples can be processed to create a biometric signature, an electronic file(s)/representation of the biometric characteristics/properties of the biometric sample of the user. Alternatively, a substantially unique/user specific portion of one or more properties/characteristics of the biometric sample can be stored as the biometric signature 230. For example, a genetic-based biometric signature can be determined from the genetic sequence/genome of a user. The user's genetic sequence can be processed to isolate one or more portions that are statistically unlikely to be present in another person's genetic sequence. The substantially unique/user-specific portion(s) of the user's genetic sequence can be stored as the biometric signature 230 associated with the user. During subsequent authentication processes, the biometric authentication module 210 is only required to determine if the genetic-based biometric signature 230 is present in the biometric sample in order to authenticate the user.

In an embodiment, the biometric signature 230 can be transmitted/provided to the user device 200. The user can provide one or more biometric samples to a third party for testing/analysis and the third party can return one or more biometric signatures 230 of the user based on the testing/analysis. The biometric signature(s) 230 can then be provided to the user device 200, such as by transmitting a file containing the biometric signature 230, or digital representation thereof.

The biometric signature 230, and/or data thereof, can be stored securely in/on the user device 200 to prevent tampering. Various devices, systems and/or software can be used to protect the stored biometric signature 230 on the user device 200. In an example, the biometric signature 230 can be provided to the device on write-protected memory from which the biometric signature 230 can be obtained from or that can be inserted/installed within the user device 200 and queried for the biometric signature 230.

The biometric sample analysis module 240 can analyze the biometric sample to determine if the biometric signature 230 is present within the biometric sample. The biometric sample analysis module 240 can include various systems and/or features to allow genetic analysis 242, image analysis/recognition 244, audio analysis/recognition 246 and/or other analysis of the biometric sample. If the biometric sample analysis module 240 determines that the biometric signature 230 is present in the analyzed biometric sample, then the biometric sample analysis module 240, or the biometric authentication module 210, can authenticate/validate the user. By authenticating the user, the user device 200 can allow the user access to various functions and/or features of the user device and/or can allow the user device 200 to be authenticated to/by a network to allow the user device 200 to access the network, its resources/features, or portion(s) thereof.

The genetic analysis 242 can analyze a DNA, or other genetic material, containing biometric sample to determine the presence of a biometric signature 230, such as a substantially unique/user-specific genetic sequence, within the biometric sample. The biometric signature 230 can be represented as an order of nucleotides, such as a DNA sequence. The unique/user-specific genetic sequence can be a portion of the user's complete genome that is statistically unlikely to be present in another user's genome. In this way, the whole genetic sequence of the user does not need to be completed as part of the genetic analysis 242, rather the genetic analysis 242 is focused on determining if a specific portion of the user's genetic sequence is present within the biometric sample. The specific portion is a portion of the genetic sequence that is statistically unlikely to be present in another person's biometric sample.

The genetic analysis 242 can include various features, devices and/or systems to assist in preparing the biometric sample for analysis. For example, the genetic analysis 242 can include amplification to increase the concentration of the genetic material in the biometric sample. The genetic analysis 242 can also include other biometric sample preparation, such as a means to open the genetic structure. Opening the genetic structure can assist with genetically sequencing the biometric sample to determine if the biometric signature 230 is present.

To perform the analysis, the genetic analysis 242 can include various features, devices and/or systems to assist/perform the requisite analysis. In an example, the genetic analysis 242 can include an interface/element that is configured to electrically and/or chemically bond to the biometric signature 230. If present in the biometric sample, the biometric signature 230 within the biometric sample will be attracted to and/or bond with the interface/element. The attraction and/or bonding to the interface/element can be detected and will be indicative of the presence of the biometric signature 230 within the biometric sample. The interface/element can be configurable so that various genetic biometric signatures 230 can be detectable using the interface/element. For example, the interface/element can have configurable electrical/chemical properties allowing it to be configured to check for a specific biometric signature 230 within the biometric sample.

In another embodiment, the interface/element can be created as part of a setup procedure. When initially setting up the user device 200, the user can provide a biometric sample to a party, such as a cellphone provider/carrier, device manufacturer, and/or a third party, that will perform a genetic analysis of the biometric sample. The analysis will generate a genetic sequence of the user and a biometric signature 230 will be determined/derived from the user's genetic sequence. A user-specific interface/element can then be created/manufactured, the user-specific interface/element will be the biometric signature 230, and/or its compliment due to the complimentary nature of genetic sequences, and can be used to determine the presence of the biometric signature 230 within a provided biometric sample based on bonding/attraction to the interface/element. The user-specific interface/element can be placed/installed in the user device 200 by a user, or other, and used for the genetic analysis 242 of biometric samples.

In another example, a device/system can translate the genetic material into electrical signals of which they are representative, or can be used to, sequence the biometric sample and the generated sequence can be compared to the biometric signature 230 to determine if there is a match/correlation between the two. If the biometric signature 230 is present in the biometric sample, then the user can be validated/authenticated.

In a further example, the genetic analysis 242 can use tagged elements, such as tagged genetic sequences and/or nanoparticles. The tagged nature of the elements can allow the genetic analysis 242 system(s)/device(s) to track the presence and/or location of the tagged element. In an example, the user's genetic sequencing can be performed by the user device 200 and/or another device/service. The user's biometric signature 230 is determined form the user's genetic sequence and tagged genetic sequences corresponding to the biometric signature 230, or one or more portions thereof, can be created/manufactured. These tagged genetic sequences are structured to bond to sequences corresponding to the genetic sequences corresponding to the biometric signature 230 and/or its compliment, or portion(s) thereof. When a biometric sample is received, the tagged genetic sequences can be mixed with the biometric sample and will bond to complimenting genetic sequences within the biometric sample, if present. These complimenting genetic sequences being the biometric signature 230 or its compliment. The genetic analysis 242 system(s)/device(s) can detect the tagged genetic sequences bonded to portions of the biometric sample and the binding indicates that the biometric signature 230, or equivalent, is present within the biometric sample. Similarly, tagged nanoparticles can be used to bond to the biometric signature 230, its compliment, or portions thereof. The tagged nanoparticles can be created/manufactured to chemically and/or electrically bond to the genetic signature 230, its compliments, or portions thereof. These tagged nanoparticles can be introduced into the collected biometric sample and the genetic analysis 242 system(s)/device(s) can detect/determine the presence of the bonding/attraction by the tagged nanoparticles within the biometric sample. This bonding/attraction is indicative of the presence of the biometric signature 230, or its equivalent, within the provided biometric sample. The use of tagged genetic sequences/nanoparticles can be single or multi-use. In the single use example, the user device 200 may need to be replenished with additional tagged genetic sequences/nanoparticles during its use. Additionally, tagged genetic sequences/nanoparticles for each biometric signature 230 associated with the user device 200 can be contained within the user device 200 to allow the user device 200 to authenticate/validate multiple users of the user device 200.

The genetic analysis 242 can include various other systems and/or devices to allow the biometric sample analysis module 240 to process and/or analyze a supplied biometric sample and determine the presence of a genetic-based biometric signature 230, or its equivalent, within the biometric sample. In response to determining the presence of the biometric signature 230, or its equivalent, within the biometric sample, the user device 200 can be unlocked and/or the user can be allowed access to one or more features/functions of the user device 200. Since the user has been validated/authenticated, the user device 200 and its use is also authenticated/validated and this can be communicated to a network to allow the user device 200 to access the network, its resources/features, or portion(s) thereof. Rather than a process of data exchange between the user device 200 and the network, the user device 200 can authenticate itself to the network, reducing the amount of data exchanged between the user device 200 and the network, and/or reducing the time needed to authenticate use of the user device 200 on/in the network.

Image analysis/recognition 244 is another analysis that can be performed by the biometric sample analysis module 240. Image analysis/recognition 244 can be used to process/analyze captured images 225, such as from the camera 226 or fingerprint sensor 227. In an example, a facial biometric signature 230 of a valid user can be created as part of creating a user profile and/or setup of the user device 200. The image capture 225 can capture one or more images of the user and the image analysis/recognition can generate a biometric signature 230 associated with the user's facial features and/or physical structure. When a user attempts to access the user device 200, the image capture 225 can capture an image of the user's face. The image analysis/recognition 244 can perform facial recognition on the captured image to determine if the captured user image matches a biometric signature 230 of a validated/authenticated user of the user device 200. If the image analysis/recognition 244 determines the presence of the biometric signature 230 in the captured image of the user, then the user device 200 can be unlocked to provide the user access to one or more functions/features of the user device. Additionally, the user device 200 can use the validation/authentication of the user to self-authenticate the user device 200 to a network. The network, in response, grants/permits the user device 200 to access the network, its resources/features, or portion(s) thereof.

In another example, the camera 226 can be used to capture, or otherwise image, the user's retina. The image analysis/recognition 244 can generate/determine a biometric signature 230 of the user based on their retinal pattern. Thereafter, a user can capture an image 225 of their retina to unlock/access the user device 200. The image analysis/recognition 244 can process/analyze the image to determine if a stored biometric signature 230 of the user is present in the captured image. If the user is validated/authenticated based on the image analysis/recognition, the user can be granted access to use/interact with the user device 200 and/or the user device 200 can self-authenticate to a network to be granted/permitted access to the network, its resources/features, or portion(s) thereof.

In another example, the biometric signature 230 can be a user's fingerprint. During setup of the user device 200 or a user profile, the user can place a finger on the fingerprint sensors 227 to generate a digital image of the user's fingerprint. The image analysis/recognition 244 can analyze the features/characteristics of the user's fingerprint and can store that analysis as the biometric signature 230 of the user. Subsequently, a user attempting to use the user device 200 can place their finger on the fingerprint sensor 227 to capture an image 225 of the user's fingerprint. The captured fingerprint can be analyzed by the image analysis/recognition 244 to determine if the features/characteristics of the captured fingerprint match those of the biometric sample 230. If so, then the user can be validated/authenticated, allowing the user to access the user device 200 and allowing the user device 200 to authenticate itself to a network to have the network grant permission/access to the network, its resources/features, or portions thereof.

Audio analysis/recognition 246 is another process/analysis the biometric sample analysis module 240 can perform on/using a biometric sample captured using the sound capture 228. People have speech patterns and/or characteristics that are substantially unique and/or that are difficult for others to mimic/copy. A biometric signature 230 for a user can be derived/determined from an audio sample of the user using the audio analysis/recognition 246. After an audio biometric signature 230 is established, a user can provide an audio biometric sample. Such an audio biometric sample can be captured by the sound capture 228, that the biometric sample analysis module 240 can process/analyze using audio analysis/recognition 246. If the captured audio sample contains characteristics/properties correlating to the stored biometric signature 230, then the user can be authenticated and granted access/permission to use/interact with the user device 200 and/or the authentication can be used to authenticate the user device 200 to a network that can grant/permit the user device 200 access to the network, its resources/features, or portion(s) thereof.

As discussed, the biometric sample analysis module 240 can analyze biometric samples to authenticate/validate a user based on a stored biometric signature 230 and/or generate/determine a biometric signature 230 for a user. Alternatively, or additionally, a user can supply a biometric sample to another party that will perform analysis of the biometric sample to determine/generate a biometric signature 230 of the user. The biometric signature 230 can then be provided/transmitted to the user device 200 and used by the biometric sample analysis module 240 to validated/authenticate a user based on a biometric sample supplied by the user.

The biometric authentication module 210 can authenticate/validate a user based on a single biometric sample provided by the user. Alternatively, or additionally, the biometric authentication module 210 can require one or more additional biometric samples for verification/authentication of a user. For example, the biometric authentication module 210 can require a user to supply two (or more) biometric samples, such as a photograph of the user and a fingerprint of the user. The biometric analysis module 240 can then process/analyze the biometric samples to determine if a biometric signature 230 of the user device 200 matches one or both of the supplied biometric samples. The biometric authentication module 210 can consider a user authenticated/validated if one of the biometric samples matches/contains a biometric signature 230 of the user. Alternatively, the biometric authentication module 210 can require that two or more of the biometric samples authenticate/validate the user based on the stored biometric signatures 230. The multiple biometric sample verification can increase the security of the device by requiring additional confirmation and/or validation of a user. Alternatively, or additionally, the verification using multiple biometric samples can be used to grant/permit the user additional permissions/privileges in the user's use of the user device 200 and/or the user's access to the network, its resources/features, or portion(s) thereof.

The various biometric authentications of the biometric authentication module 210 can require varying amounts of time/resources to complete. The biometric authentication module 210 can allow a faster authentication method, such as fingerprint/audio analysis recognition to be used to authenticate a user for a first level of access to the user device 200, or network communicatively coupled thereto, and can require a lengthier authentication is used to allow the user to have a higher, or more protected, access to the user device 200 and/or network. In another example, the biometric authentication module 210 can allow the user to use a faster biometric authentication method to access the device and can require a lengthier biometric authentication method be used occasionally (e.g., periodically and/or randomly) to confirm the validity/authenticity of the user and/or to allow the user to continue using the faster biometric authentication method to access the user device 200 and/or a network communicatively coupled thereto. In another embodiment, a user-generated authentication, such as a password or passcode, can be used in conjunction with biometric authentication of the user by the biometric authentication module 210 to allow the user to access the user device 200 and/or a network communicatively coupled thereto.

The user device 200 can include a device identification 250. The device identification can be a unique identifier associated with the user device 200 or user, such as an IMSI or MSISDN. The user device 200 can be identified to/on a network based on the device identification 250 and the network can associate granted permissions/accesses with the user device identification 250. For example, the user device 200 can biometrically authenticate a user and can then provide a network with an indication of its authentication 262, and the network can permit access to the network, its resources/features, or portion(s) thereof, by associating such access with the device identification 250.

The communication module 260 can facilitate/assist the user device 200 in communicating with external devices and/or systems, and/or accessing features/functions thereof, such as a cellphone network. The communication module 260 can include an authentication 262, such as a notification/indication, that can be provided to an external device/system that requires an authentication to permit the user device 200 to access/interact with various functions/features of the external device/system. In an example, the external device/system can be a cellular telephone/data network that the user device 200 can access to allow a user to make phone calls and/or interact with the Internet. The network can require the device be authenticated/verified before allowing the device to access the features/services of the network, or a portion(s) thereof. The user, a subscriber of the network, can be biometrically authenticated by the user device 200 as a known/registered user of the user device 200. The network has an association of the user as a subscriber of the network and the user's user device 200 as being a way for the user to access the network. The user device 200 can provide an authentication 262 to the network and the network, knowing the user's association with the user device 200, can grant/permit the user device 200 to access the network, or portion(s) thereof, since a biometrically authenticated user, a subscriber, is using the user device 200. In this manner, an exchange of data, such as a challenge-and-response authentication typically carried out, can be bypassed since the user device 200 has authenticated itself and its user on the user device 200 and can provide an authentication 262 to the network indicating as such. This reduces the bandwidth allocation necessary to allow the user device 200 and network to communicate for authentication purposes.

Figure 3:
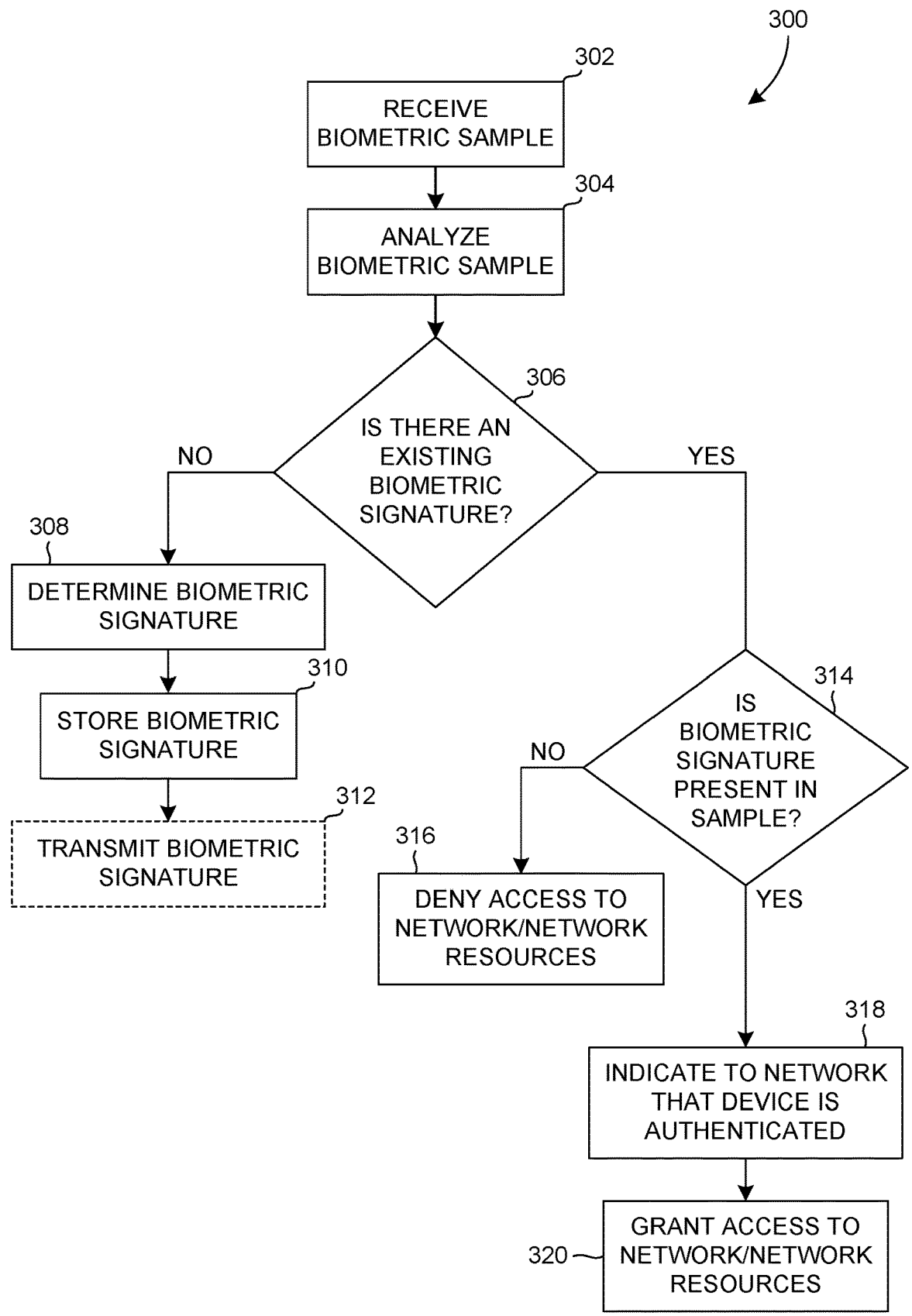
FIG. 3 is an example method of authenticating a user device.

FIG. 3 is an example method 300 of authenticating a user device to allow the user device to access a network and/or its resources/features. At 302, the device receives a biometric sample. The biometric sample can be provided by, or obtained from, a perspective user of the device. Example biometric samples can include an image of the face of the user, a fingerprint of the user, an audio sample of the user speaking, a genetic material containing sample from the user, such as blood, exhaled breath condensate or saliva, and/or other biometric samples. At 304, the biometric sample can be analyzed by the user device. The user device can include one or more elements/systems that can analyze the biometric sample, such as genetic analysis, image analysis/recognition, audio analysis/recognition and/or other biometric sample analyses.

At 306, a determination is made if there is an existing biometric signature stored on the user device. A biometric signature is a substantially user-specific/unique biometric property/characteristic that another person is statistically unlikely to have. While many people can share similar characteristics/properties, such as in appearance or genetic sequence, there are differences that are substantially unique to each particular person. Therefore, the biometric signature of a person/user is unlikely to be provided by another person and due to its uniqueness, can be used to authenticate/validate a perspective user as a registered user.

If there is not an existing biometric signature, such as may happen during initial setup of the user device having no previously registered users, method 300 proceeds to 308 where a biometric signature of the user is determined from the biometric sample analysis at 304. The biometric sample analysis of 304 can be analyzed/processed to determine/derive a biometric signature for the user. In an example, the biometric signature can be a user-specific/unique sequence of genetic code, a digital representation of the user's face, fingerprint and/or audio sample, and/or other user-specific/unique biometric characteristic/property.

At 310, the determined biometric signature can be stored on the user device. The stored biometric signature will be used in subsequent biometric authentications of perspective users. The biometric signature is stored securely on the user device, such as a cellphone, in a memory of the user device and/or a physical element of the user device. For example, the biometric signature can be represented by an element having an interface/bonding/attraction capability that is associated with the biometric signature. In another example, the biometric signature, such as a user's facial structure, can be stored as a digital file in the memory of the user device.

At 312, optionally, the biometric signature can be transmitted to an external device/system, such as a network. In an example, the biometric signature of the user can be transmitted and stored on a network to which a user device requires authentication/validation to access and/or with which it requires authentication/validation to interact. The network can store the biometric signature in a profile of the user, such as a subscriber account record. In subsequent interactions, the user device can provide a biometric signature to validate/authenticate the user device and its ability to access the network, the network can compare the provided biometric signature with the stored biometric signature to validate/authenticate the device.

The steps 308, 310, and, optionally, 312 can be repeated to create/generate another/alternative biometric signature for a user and/or to create/generate biometric signatures for other permitted/registered users of the user device. Each user of the user device can have one or more biometric signatures associated therewith and the stored biometric signatures can be used to validate the user to allow the user to use, or interact with, the user device and/or allow the user device to access a network, its resources/features, or portion(s) thereof.

If, at 306, there is an existing biometric signature, the method 300 proceeds to 314 to determine if the biometric signature is present in the received biometric sample of 302. The analysis of the biometric sample 304 is compared with the biometric signature(s) to determine if the biometric signature is present in the biometric sample, which indicates an authorized user provided the biometric sample and should be permitted/granted various access to the user device and/or a network, or portion(s) thereof. In an example, the biometric sample can be genetically analyzed to determine if a genetic biometric signature, a user-specific sequence of genetic code or equivalent, is present in the provided/received biometric sample.

If the biometric signature is not present in/does not match the biometric sample, then the method 300 proceeds to 316 and the perspective user is denied access to the user device and/or the user device is denied access to a network, its resources/features, or portion(s) thereof. The user, or user device, can have no, limited/reduced, or full access to the network based on the failed biometric authentication of 314. In an example, the user/user device can be granted access to the network despite the failed biometric authentication and can be required to attempt biometric authentication at a later time and/or the user can provide a substitute authentication, such as a password/passcode. Alternatively, or additionally, the user device can include an emergency operations option to allow the user device to access the network and/or its resources/features. The user may not be required to provide any authentication to configure the device to operate in the emergency operations mode; however, the user's access to/interactions with the user device and/or the user device's access to the network may be reduced/limited based on the user device operating in the emergency operations mode. For example, the user device and network can permit the user to call/contact emergency services and/or an emergency contact using the user device in the emergency operations mode.

If the biometric signature is present in the biometric sample, then the method 300 proceeds to 318 and the user device indicates to a network that the device is authenticated. Since the user is an authorized user of the network, such as a subscriber, authenticating that the user is using the user device can provided the necessary authentication to allow the user device to access the network, its resources/features, or portion(s) thereof. The user device can provide a notification/indication to the network that a user using the device is biometrically authenticated to use the device and therefore the user device is authenticated to use/access the network. At 320, the access to the network, its resources/features, or portion(s) thereof, is granted and the user device can interact with the network to perform various functions. In an example, the user device can be a cellular telephone device, such as a smartphone, and the network can be a cellular network. The biometric authentication of a user of the smartphone can allow the smartphone to provide an authentication indication to the cellphone network to allow the smartphone to access features of the cellphone network, such as use the Internet and/or make phone calls.

Figure 4:
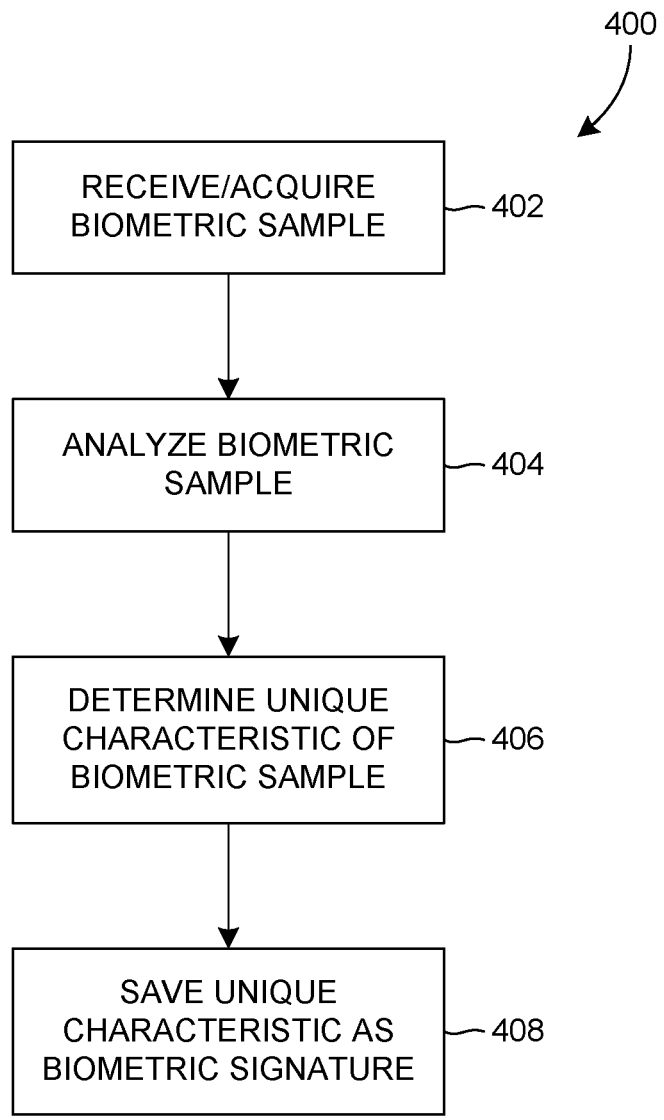
FIG. 4 is an example method of determining a biometric signature.

FIG. 4 is an example method 400 of determining/generating a biometric signature for a user of a user device. At 402, a biometric sample is received/acquired from the user. The biometric sample can an image of the user, the user's fingerprint, an audio sample of the user, a sample containing genetic material of the user, and/or other biometric samples having substantially user-specific/unique properties/characteristics. At 404, the biometric sample is analyzed, this can include image analysis, audio analysis, genetic analysis and/or other analyses based on the nature of the biometric sample of 402. At 406, unique characteristic(s)/property(s) of the biometric sample are determined, such as a representation of the user's face, fingerprint or speech, a substantially unique genetic sequence of the user and/or other substantially user-specific/unique characteristic(s)/property(s) of the biometric sample of 402. In the example of a genetic sequence, the user's complete genetic sequence does not need to be considered a biometric signature, rather one or more portions of the user's genetic sequence, that are substantially/statistically unique to the user, can be used/considered as the biometric signature of the user. Finally, at 408, the unique characteristic(s)/property(s) of the user's biometric sample are stored as a/the biometric signature associated with the user. This stored biometric signature can be used in a biometric authentication to authenticate/verify the user, by determining that a subsequent biometric sample of the user include, or is substantially the same as, the stored biometric signature of 408.

Figure 5:
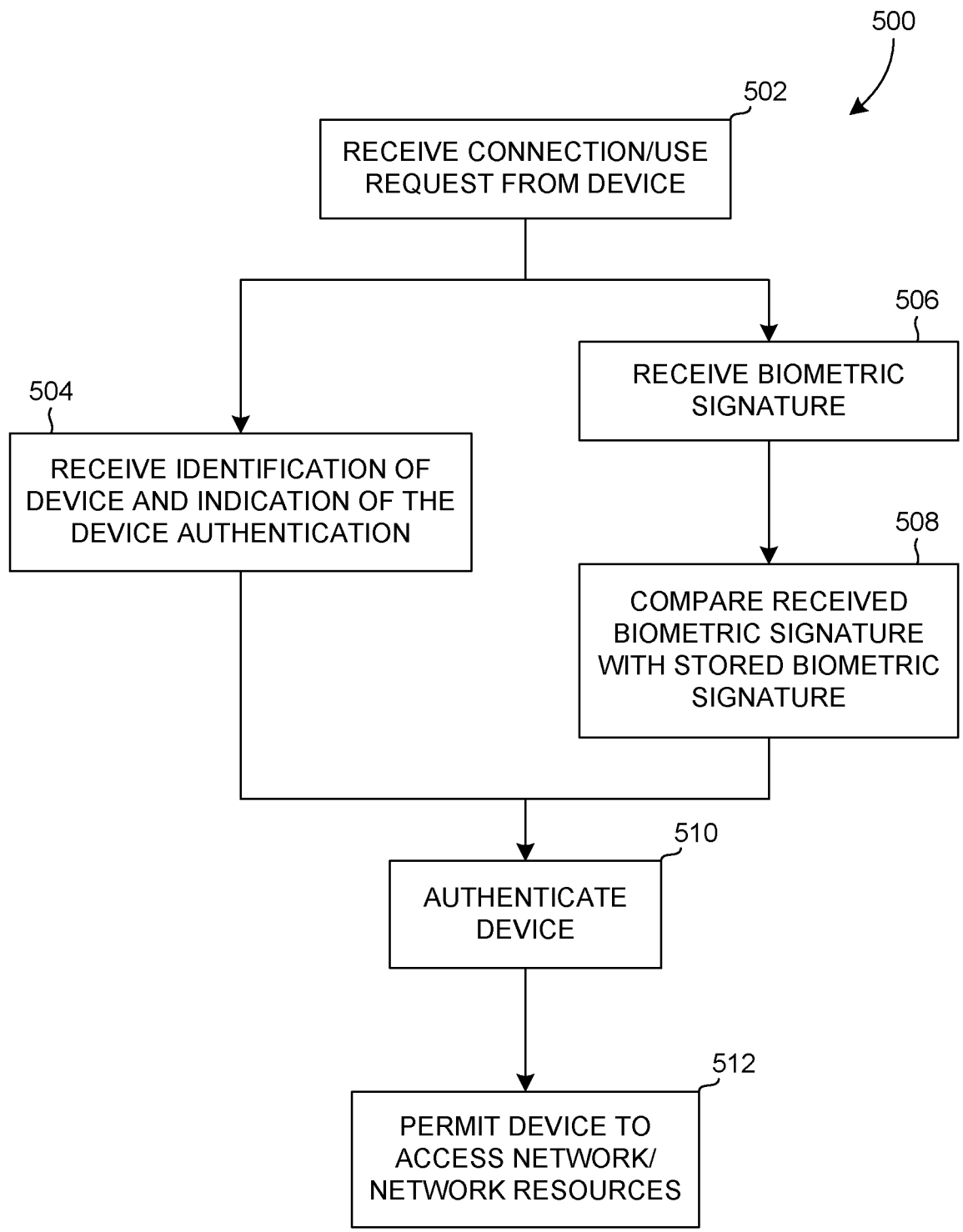
FIG. 5 is an example method of a permitting a user device to connect to a network.

FIG. 5 is an example method 500 of a permitting a user device to connect to a network and/or access the resources/features thereof. At 502, the network can receive a connection/use request from the user device. At 504, the network can receive an identification of the device and an indication of the device authentication. The device authentication can be based on an on-device authentication of the user of the user device. The biometric authentication of the user can allow the user device to provide an authentication to the network to authenticate the user device at 510. In this manner, the user device and network do not need to have multiple exchanges of information to authenticate the user device, rather the user device can self-authenticate to the network.

An alternative authentication pathway can include the network receiving a biometric signature from the user device at 506. The biometric signature can be an analysis of a biometric sample received/obtained from the user. In an example, the biometric signature can be an image analysis of an image of the user and/or their fingerprint. The received biometric signature can be compared to a stored biometric signature on the network at 508. If the received biometric signature/analysis matches the stored biometric signature than the device and/or user can be authenticated at 510.

Once authenticated at 510, the network can permit the user device to access the network and/or its resources/features. In another example, the authentication of the user device at 510 can permit the user device to access resources/features of the network that were not previously accessible to the user device prior to the device authentication at 510. The authentication of the user device can be required at intervals to allow the user device continued access to the network, its resources/features, or portion(s) thereof.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

The invention claimed is:

1. A system for authenticating a user device having a user device identification to a network site of a current geographic coverage zone, the network site located within a telecommunications network having multiple geographic coverage zones, comprising:
　a biometric authentication module stored on the user device, including:
　　a biometric sample collection module configured to one or more of receive or collect a biometric sample of a user,
　　a biometric signature of the user, the biometric signature stored on the user device, and
　　a biometric sample analysis module configured to analyze the biometric sample for biometric verification of the user by:
　　　processing the biometric sample into one or more representative characteristics;
　　　comparing the stored biometric signature to the one or more representative characteristics of the biometric sample, and
　　　determining a presence of the biometric signature in the at least the portion of the biometric sample, the determination made based on the comparison of the stored biometric signature to the one or more representative characteristics of the biometric sample;
　　self-authenticating a user associated with the biometric signature based on the determined presence of the biometric signature;
　　based on the self-authentication of the user, generating an instruction to transmit to a remote network site a single self-authentication request and the user device identification, the single self-authentication request including an authorization to establish communication between the user device and the network site in the current geographic coverage zone, and
　a communication module configured to:
　　determine that the user device is physically moved into the current geographic coverage zone from a previous geographic coverage zone;
　　in response to determining that the user device is physically moved into the current geographic coverage zone from the previous geographic coverage zone and in response to receiving the single self-authentication request and the user device identification, cause the user device to connect to the network site, and
　　in response to receiving the single self-authentication request, permit communication between the user device and the network site, the communication including all features available from the network site to the user device.

2. The system of claim 1, wherein the biometric sample is a sample that contains genetic material of the user.

3. The system of claim 2, wherein the biometric sample is an exhaled breath condensate of the user.

4. The system of claim 2, wherein the processing the biometric sample includes translating at least a portion of a sequence of the genetic material into at least a representative characteristic, the representative characteristic being an electrical signal representative of the at least a portion of the sequence of the genetic material.

5. The system of claim 1, wherein the biometric signature of the user is determined during setup of the user device.

6. The system of claim 1, wherein the biometric signature is determined by a third party and is provided to the user device.

7. The system of claim 1, wherein the biometric signature is also stored on the network and is associated with the user associated with the user device.

8. The system of claim 7, wherein the communication module transmits the biometric sample analysis to the network and the network authenticates the user device based at least in part on the comparison of the stored biometric signature to the biometric sample analysis.

9. The system of claim 7, wherein the communication module transmits the biometric signature of the user to the network and the network identifying the user of the user device based on the communicated biometric signature.

10. The system of claim 1, wherein the biometric authentication module is on at least one of the user device or a secondary device communicatively coupled to the user device.

11. The system of claim 1, wherein the biometric sample analysis module is further configured to analyze the biometric sample while interacting with the user device.

12. A method of authenticating a user device having a user device identification to a network site of a current geographic coverage zone, the network site located within a telecommunications network having multiple geographic coverage zones, comprising:
receiving a biometric sample of the user;
analyzing the biometric sample to determine if a stored biometric signature of the user device is present in the biometric sample;
self-authenticating at the user device, a user associated with the biometric signature based on the presence of the biometric signature in the biometric sample;
based on the self-authentication at the user device, transmitting an instruction to a remote network site that includes a single self-authentication request and the user device identification, the single self-authentication request including an authorization to establish communication between the user device and the network site in the current geographic coverage zone;
determine that the user device is physically moved into the current geographic coverage zone from a previous geographic coverage zone;
in response to determining that the user device is physically moved into the current geographic coverage zone from the previous geographic coverage zone and in response to the remote network site receiving the self-authentication request and the user device identification, causing the user device to connect to the network site; and
in response to receiving the self-authentication request, permitting the user device to access one or more features of the network based on the self-authentication of the user device to the remote network site.

13. The method of claim 12, wherein the biometric signature is determined during a setup of the user device.

14. The method of claim 12, wherein the biometric signature is determined by a third party that provides the biometric signature to the user device.

15. The method of claim 12, further comprising storing the biometric signature on the network for use in future authentication processes, the stored biometric signature retrievable from the network for use in analyzing a further biometric sample.

16. The method of claim 15, further comprising transmitting the analysis of the biometric sample to the network and wherein the permitting the user device to access one or more features of the network is based at least in part on a comparison of the analysis of the biometric sample and the stored biometric signature.

17. The method of claim 12, further comprising requiring a second authentication of the user device based on at least an expiration of a validity of a previous authentication.

18. The method of claim 12, further comprising requiring a second authentication of the user device based on a request received from the network.

19. The method of claim 18, wherein the request is based on at least one of the user device requesting access to one of the one or more features of the network or the network determining the user device is attempting to access one of the one or more features of the network.

* * * * *